April 4, 1950 J. MARTIN 2,502,470
EJECTING MEANS FOR CHAIR STABILIZING DROGUE PARACHUTES
Filed Dec. 9, 1947 3 Sheets-Sheet 1
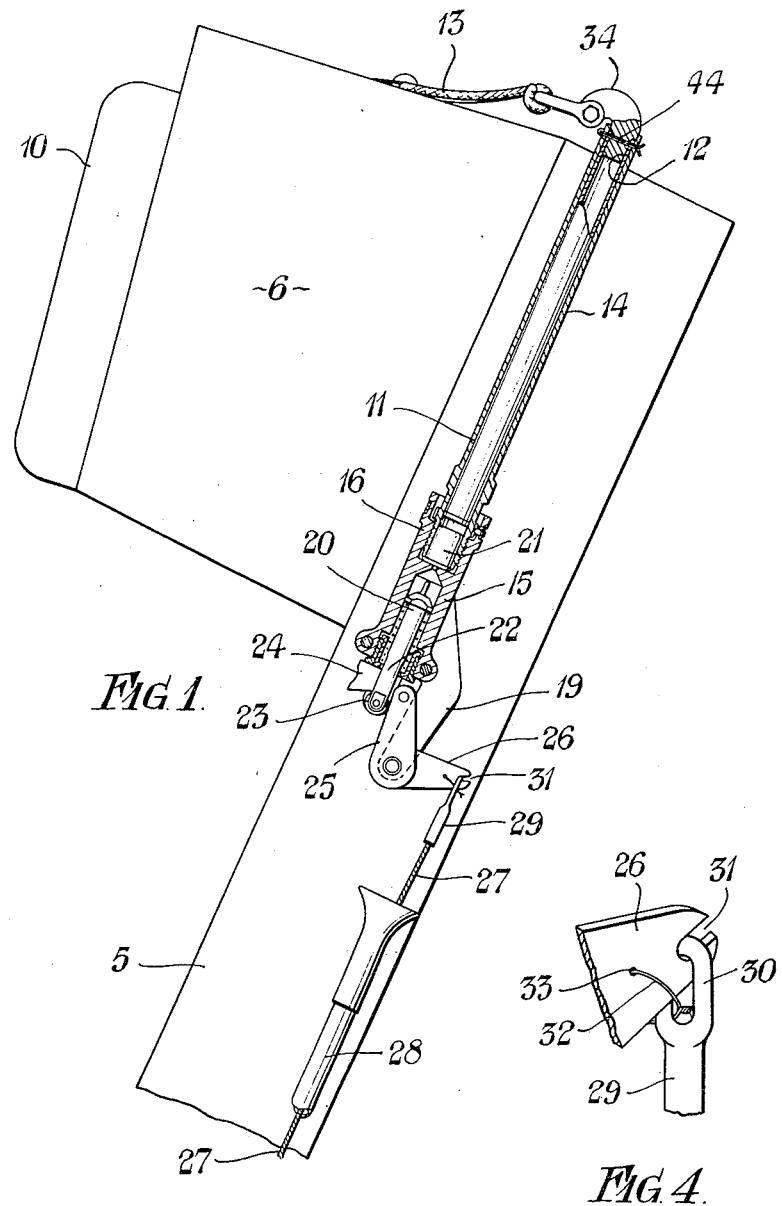

April 4, 1950   J. MARTIN   2,502,470
EJECTING MEANS FOR CHAIR STABILIZING DROGUE PARACHUTES
Filed Dec. 9, 1947   3 Sheets-Sheet 2
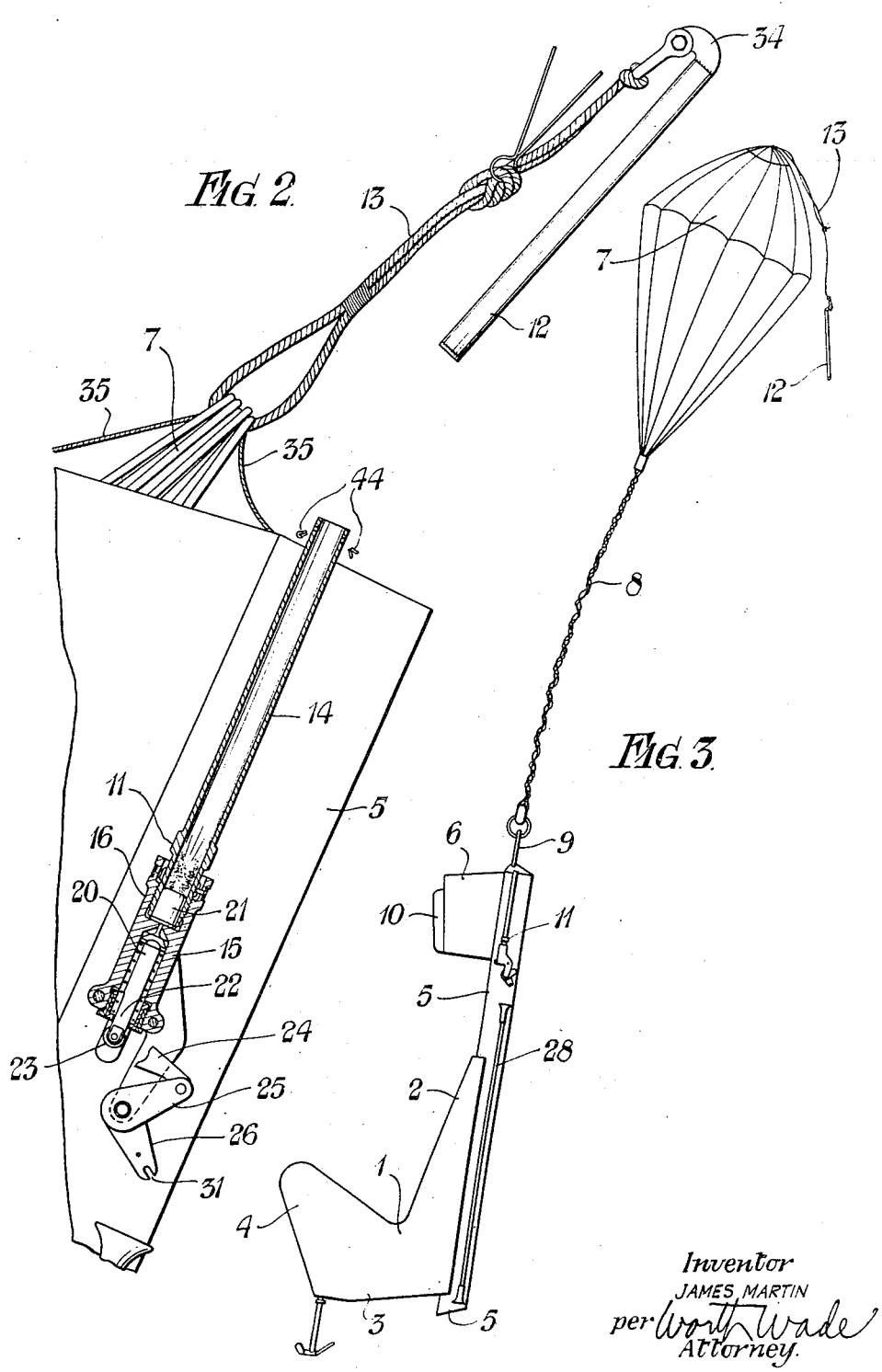

April 4, 1950         J. MARTIN         2,502,470
EJECTING MEANS FOR CHAIR STABILIZING DROGUE PARACHUTES
Filed Dec. 9, 1947                    3 Sheets-Sheet 3
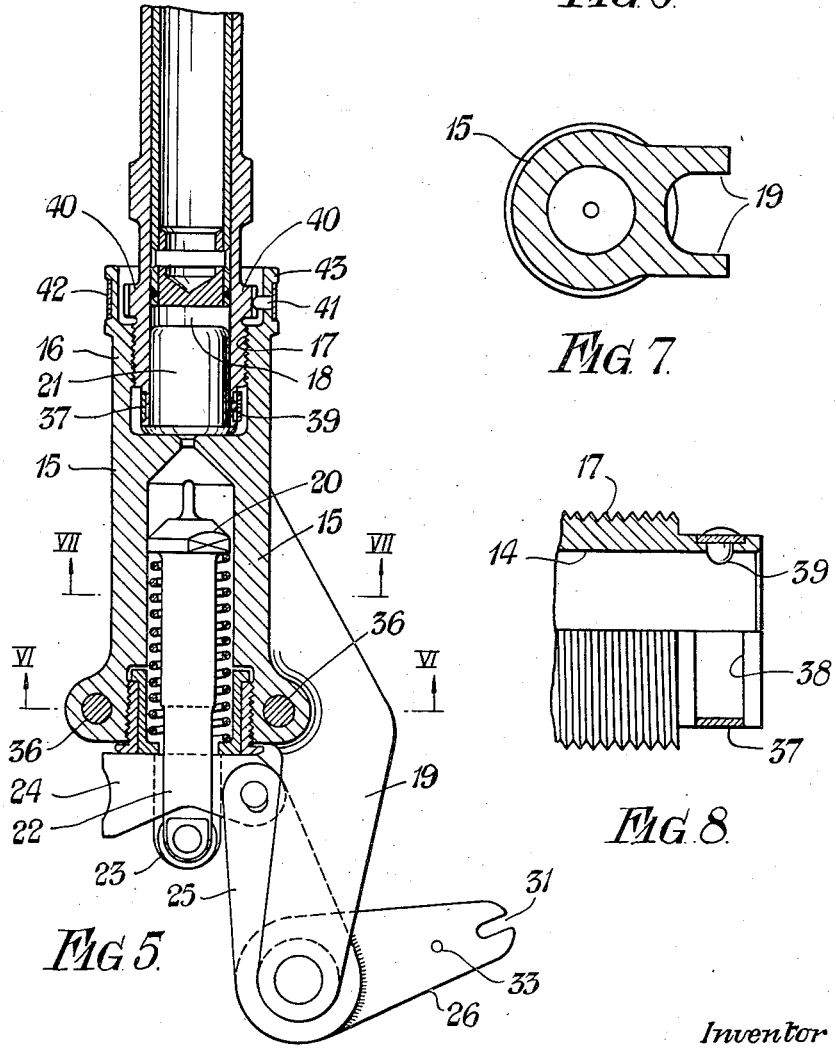
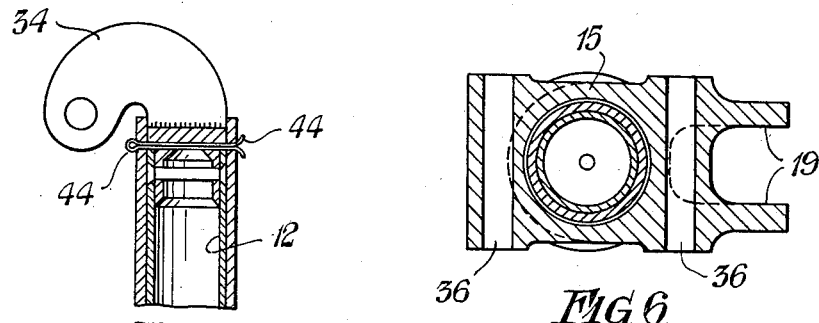
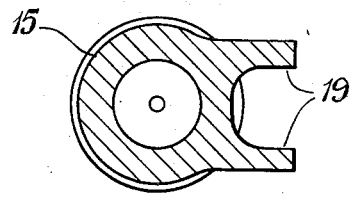
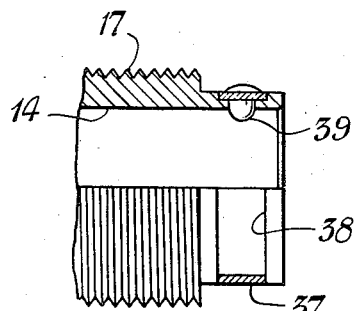
Inventor
JAMES MARTIN
per Worth Wade
Attorney.

Patented Apr. 4, 1950

2,502,470

UNITED STATES PATENT OFFICE 2,502,470

EJECTING MEANS FOR CHAIR STABILIZING DROGUE PARACHUTES

James Martin, Higher Denham, near Uxbridge, England

Application December 9, 1947, Serial No. 790,486
In Great Britain August 31, 1946

6 Claims. (Cl. 244—122)

This invention relates to ejecting means for chair stabilizing drogue parachute for use with high speed aeroplanes in which ejection mechanism is provided in conjunction with the seat for the pilot or other occupant of the aeroplane and which acts to launch the seat and its occupant from the aeroplane when it is necessary to make a parachute escape therefrom. Such escape drops by parachute are usually the result of some emergency and may take place whilst the aeroplane is travelling at a very high speed, as for example, when the aeroplane is in an uncontrolled dive or in a spin or otherwise acting erratically. In such circumstances the occupant endeavouring to leave the aeroplane will be subjected to very great air pressure against which he will be almost powerless. As a result there is considerable danger that he may be unable to get out of the cockpit, or his harness or parachute may get caught up on some part of the aeroplane or he may be flung against and strike some part of the tail-plane, rudder or fin or other part of the aeroplane, whereby he may be killed or incapacitated from taking the necessary action required to make a successful drop by parachute.

On U. S. Patent No. 2,467,763 of April 19, 1949, is described and illustrated a construction and arrangement of seat with ejection mechanism for launching it and its occupant from an aeroplane in a controlled and orderly manner so as to avoid the risk of striking against or being caught up on any part of the aeroplane. The invention also includes safeguards to protect the occupant against the effects of the air pressure and rapid acceleration to which he may be subjected.

An object of the present invention is to ensure the correct functioning of the seat and the parachute when the seat and occupant is launched from the aeroplane and for this purpose a drogue parachute is provided with means for bringing it into operation automatically when required.

According to this invention, parachute escape apparatus for launching a pilot or other occupant from an aeroplane in flight is provided with a drogue parachute connected to the escape apparatus or to the main parachute carried by the apparatus or the occupant and means for bringing the drogue parachute into operation automatically when the escape apparatus is launched from the aeroplane.

In practice the launching apparatus comprises a seat mounted on guides directed toward the cockpit opening or other outlet from the aeroplane and which is adapted to be propelled along its guides by means of gases under pressure obtained from an explosive cartridge acting between a co-operating cylinder and ram carried by the seat and its guides. The seat is preferably of light metal construction and the back of the seat has two side members connected at their upper ends by an arch shaped member. The arch shaped member may be fabricated from sheet metal suitably shaped and welded and formed with sockets at each side to receive the ends of channel section side members of the back of the seat. A central opening or socket is provided in the arch shaped member to receive and anchor the upper end of the impeller unit with the cartridge chamber and firing mechanism. The arch shaped member may however be a light forging, stamping or casting of suitable shape and material.

An ejector gun is provided on the seat for drawing out a drogue parachute connected to the seat and this comes into operation automatically when the seat, with its occupant, has been expelled from the aeroplane. For this purpose the firing mechanism of the ejector gun is connected by a static line or cable with a suitable fixed part of the aeroplane so that when the seat is safely launched from the aeroplane, the pull on the cable will cause the gun to be fired to draw out the drogue parachute after which the static line will be automatically released.

One or more drogue parachutes and ejection guns according to this invention may be mounted near the wing tips, tail plane or other suitable part of an aeroplane, to act, when released to correct or control any dangerous "spin" which the aeroplane may develop.

In order that the invention may be more readily understood it will now be more particularly described with reference to the accompanying drawings in which:

Fig. 1 is a fragmentary side elevation showing the upper part of the back of an ejection seat with the container for the drogue parachute and the drogue parachute gun, partly in section, mounted thereon.

Fig. 2 is a similar view to Fig. 1 (partly broken away) showing the parts after the seat has been ejected from an aeroplane and the drogue parachute gun has been fired.

Fig. 3 is a diagrammatic side elevation showing the seat suspended and steadied by the drogue parachute after having been ejected from an aeroplane.

Fig. 4 is a detail showing how a static line from the aeroplane is releasably connected to the firing mechanism of the drogue parachute gun.

Fig. 5 is a sectional elevation through the drogue parachute gun, to a somewhat larger scale.

Figs. 6 and 7 are cross sections on the lines VI—VI and VII—VII respectively of Fig. 5, and Fig. 8 is a detail view partly in section of the breech end of the gun barrel showing a spring clip for retaining a cartridge in the breech, when the gun barrel is lifted out of the gun body.

In the arrangement illustrated in the drawings, the ejection seat is shown in Fig. 3 after it has been launched and with the drogue parachute developed. This drogue parachute is not intended to completely support or suspend the seat or its occupant but acts as a drag to steady the seat in an upright position and damps out or prevents any tendency to rock about or turn over and over which the seat might otherwise develop when first ejected from the aeroplane. The seat 1 shown in Fig. 3 has an inclined back 2, a forwardly directed seat pan 3 and side wings 4 to prevent the occupant's legs from being forced apart by the air pressure which will be met when the seat is launched from an aeroplane in flight. The seat 1 is adjustably mounted on the seat frame 5 in order to provide ready means for adjusting the height of the seat pan 3 to suit tall or short occupants.

Mounted on the front of the seat frame 5 near its upper end is a suitably shaped compartment 6 in which is packed the drogue parachute 7 which in Fig. 3 is shown connected by a suitable nylon cable 8 to a shackle 9 at the top of the seat frame 5. The compartment 6 is formed with suitably sloping sides to enable the folded parachute to be drawn out freely when required. On the front of the compartment 6 is provided a pad 10 to form a head rest for the occupant of the seat.

An ejector gun 10 is mounted on the seat frame 5 as shown in Figs. 1 and 2 and is provided with a piston 12 adapted to be fired from the gun to draw the drogue parachute 7 out of the compartment 6 by means of the cable 13 connecting it to the folded parachute 7.

The ejector gun 11 shown in Figs. 1 and 2 and to a larger scale in Fig. 5 comprises a suitable barrel 14 having one end mounted in a suitable bracket 15 on the back 5 of the seat 1. It is preferred to mount the bracket on one of the side members of the seat back 5. In the bracket 15 is formed a screw threaded socket 16 into which the screw threaded breech end 17 of the gun barrel 14 is screwed. A cartridge chamber 18 is formed between the breech end 17 of the gun barrel 14 and the socket 16 in the bracket 15 in which it engages and firing mechanism is provided and carried by the lugs 19 on the bracket 15 which supports the gun. This firing mechanism is similar to that described in the specification of my co-pending patent application Serial No. 693,761, filed August 29, 1946. This comprises a spring loaded firing pin 20 slidably mounted in guides and directed toward the cap of the cartridge 21 in the cartridge chamber of the gun. The end 22 of the firing pin 20 extends beyond its guides and is forked and carries a roller 23. A wedge shaped sear 24 is mounted to slidably engage this roller 23 and coacts with it so that endwise movement of the sear 24 first acts to "cock" and then release the firing pin 20 so that when it is completely withdrawn it will strike upon and fire a cartridge 21 in the cartridge chamber of the gun 11.

The sear 24 of the firing mechanism is slidably engaged in the forked end 22 of the firing pin 20 and one end of the sear 24 is connected to a bell-crank actuating lever 25, the other end 26 of which is connected to the static line 27 which passes through a tubular guide 28 on the seat frame 5 and is anchored at its other end to a suitable fixed part of the aeroplane. When the static line 27 is drawn taut after the seat has been launched, it will move the bell-crank lever 25, causing the seat 24 to cock and then release the firing mechanism to explode the cartridge and fire the gun. The static line 27 has a ferrule 29 with a loop 30 at its upper end which engages in the slotted end 31 of the limb 26 of the bell-crank lever 25. A wire tie 32 passed through the loop 30 and a hole 33 in the limb 26 secures the ferrule 29 of the static line 27 against accidental displacement. When the static line 27 is drawn taut the bell-crank lever 25 will be turned to pull out the sear 24. The wire tie 32 will break and all connection with the aeroplane is severed.

The barrel 14 of the gun is screwed at its breech end 17 into the screw threaded socket 16 in the gun mounting bracket 15 and a piston 12 is fitted into the gun barrel 14 and is a free sliding fit therein. The upper end of the piston extends beyond the gun barrel 14 and is fitted with a curved laterally extending lug 34 to which is secured one end of the cable 13, the other end of which is connected to the drogue parachute 7. When the gun 11 is fired, the piston 12 is expelled from the barrel 14 and exerts a sharp pull on the cable 13 connected thereto. The first effect of this is to pull out a pin which holds in place a number of canvas or other flaps 35 (see Fig. 2) which retain the drogue parachute in the compartment 6. Further pull on the cable 13 draws out the drogue parachute clear of the vortex created by the aeroplane, or the seat.

Details of the drogue parachute gun are shown to a somewhat larger scale in Figs. 5, 6, 7 and 8. The bracket 15 which forms the body of the gun is provided with two transverse holes 36 through which bolts are passed to clamp it directly to the side member of the seat frame 5. The barrel 14 of the gun is screwed into the socket 16 of the bracket 15 and thereby secures the cartridge 21 in the chamber 18. The spring ring 37 located in the groove 38 on the lower end of the barrel 14 (see Fig. 8) has a rounded pin 39 which projects inwardly through a hole in the barrel 14 so as to press resiliently against the cartridge case to hold it in position in the breech, whilst the gun barrel is being screwed into or removed from the socket 16 in the bracket 15. In order to lock the gun barrel 14 in the socket 16, the barrel is provided with a collar 40 having longitudinal serrations with which may engage an inwardly projecting round headed pin 41 on a spring ring 42 located in a groove formed in the outer surface of the recessed upper end 43 of the socket 16. This serves as a ratchet lock to prevent accidental unscrewing of the gun barrel 14. The piston 12 is held in position against accidental displacement by means of split pin 44 which passes directly through the upper end of the piston 12 and the barrel 14. When the charge in the cartridge 21 is fired to discharge the piston 12, the split pin 44 will be sheared under the force exerted by exploding charge of the cartridge 21.

The drogue parachute 7 may be connected to the back 5 of the ejection seat 1 as illustrated in Fig. 3 in which it acts as a steadying device to damp out oscillations and irregular movements of the seat after it has been discharged from an aeroplane and also acts to hold the seat in an upright position and may allow it to float gently down to the ground after the occupant has left the seat. If desired however the drogue parachute may be connected to the main parachute which is packed and carried by the seat or the occupant thereof in the usual manner. In this case the drogue parachute will draw out the main parachute and ensure its proper development. In another alternative drogue parachutes and guns according to this invention may be mounted on the wings, tail or other parts of an aeroplane and arranged to be discharged under the control of the pilot to act as landing brakes or to correct or prevent a "spin" or other objectional movement which an aeroplane may develop in flight.

I claim:

1. In parachute escape apparatus, an ejection seat with means for ejecting it from an aeroplane, a compartment on the seat back, a drogue parachute suitably folded in the compartment, a cable connecting the parachute to the seat back, a gun mounted on the seat and comprising a gun bracket secured to the seat frame, a gun barrel screwed into a screw threaded socket in the bracket, a serrated collar on the gun barrel a spring ring surrounding the socket, a pin on the spring ring to engage the serrated collar, a cartridge chamber at the breech end of the gun barrel, means for retaining a cartridge in the chamber, a piston slidably fitted in the gun barrel, a cable connecting the piston to the drogue parachute, firing mechanism in the gun bracket and means for actuating the firing mechanism after the seat has been ejected from an aeroplane.

2. A parachute escape apparatus according to claim 1, in which said firing mechanism comprising a spring loaded firing pin, a slotted end and an abutment to the firing pin, a wedge-shaped sear engaging the abutment, a pivoted lever to withdraw the sear, a static line having a loop at its end engaged in a slot in one end of the lever and a guide on the seat back through which the static line passes to a fixture on the aeroplane to which it is secured, the loop end of the static line being arranged to automatically release itself from the slotted end of the lever when the firing mechanism has been actuated.

3. A parachute escape device comprising, in combination, an ejection seat, a drogue parachute, a connection from the parachute to the seat, a compartment on the seat in which the parachute is contained, a gun mounted on said seat and having an explosion chamber, a piston positioned in said chamber and adapted to be ejected from the chamber when said gun is fired, a connection from said piston to said drogue parachute, means for firing the gun, and means attached to the gun for actuating said firing mechanism automatically after the seat has been ejected from an aeroplane.

4. A parachute escape device as recited in claim 3 in which the explosion chamber is provided with means which normally secures the piston in said chamber but which will be released when the gun is fired.

5. A parachute escape device as recited in claim 3, in which the means for actuating said firing mechanism comprises a static line having one end connected to said aeroplane and having the other end connected to said gun by means which will be released when the line is subjected to tension.

6. A parachute escape device as recited in claim 3, in which the connection between the drogue parachute and the seat is a flexible line having one end connected to the top of said seat.

JAMES MARTIN.

REFERENCES CITED

The following references are of record in the file of this patent:

UNITED STATES PATENTS

| Number | Name | Date |
| --- | --- | --- |
| 1,270,419 | Kendig | June 25, 1918 |
| 1,874,237 | Bruno | Aug. 30, 1932 |
| 2,051,927 | Wiley | Aug. 25, 1936 |
| 2,073,128 | Wadsworth | Mar. 9, 1937 |
| 2,399,136 | Mount | Apr. 23, 1921 |

FOREIGN PATENTS

| Number | Country | Date |
| --- | --- | --- |
| 168,396 | Great Britain | Aug. 29, 1921 |
| 719,226 | France | Nov. 14, 1931 |
| 179,936 | Switzerland | Mar. 2, 1936 |